(12) United States Patent
Fukushima et al.

(10) Patent No.: US 6,705,860 B2
(45) Date of Patent: Mar. 16, 2004

(54) SETTER FOR BURNING

(75) Inventors: Hideko Fukushima, Kumagaya (JP); Hirohisa Suwabe, Kitakyushu (JP)

(73) Assignee: Hitachi Metals Ltd., Tokyo (JP)

( * ) Notice: Subject to any disclaimer, the term of this patent is extended or adjusted under 35 U.S.C. 154(b) by 330 days.

(21) Appl. No.: 09/967,971

(22) Filed: Oct. 2, 2001

(65) Prior Publication Data

US 2002/0042037 A1 Apr. 11, 2002

(30) Foreign Application Priority Data

Oct. 3, 2000 (JP) .................................... 2000-304049

(51) Int. Cl.⁷ ............................................. C04B 33/32
(52) U.S. Cl. ................... 432/261; 428/116; 264/630
(58) Field of Search ..................... 432/81, 258, 261; 264/630, 631; 428/116; 165/80.1

(56) References Cited

U.S. PATENT DOCUMENTS 3,559,836 A * 2/1971 Pink et al. .................. 206/557
6,461,156 B2 * 10/2002 Kumazawa et al. ......... 432/261
6,596,372 B2 * 7/2003 Ito et al. ..................... 428/116

FOREIGN PATENT DOCUMENTS

| JP | 1-54636 | 11/1989 | .............. F27D/3/12 |
| JP | 2-74567 | 3/1990 | .......... C04B/35/64 |
| JP | 11-79853 | 3/1999 | .......... C04B/35/64 |

* cited by examiner

*Primary Examiner*—Gregory Wilson
(74) *Attorney, Agent, or Firm*—Sughrue Mion, PLLC

(57) ABSTRACT

A setter for burning, which has no influence on the burning behavior of ceramic electronic parts to be situated thereon, is provided. A honeycomb structure is formed in which a plurality of ventilation cells that is formed by each partition wall having a thickness of 0.05 to 1.0 mm in a thick direction of the setter for burning from a side of a front surface of an electronic part placement surface of the setter for burning and that is each partitioned in a pitch of 0.5 to 5.0 mm passes through. A supporting member is provided in a side of a rear surface of the electronic part placement surface. Therefore, the setter for burning can be situated in a floating state.

14 Claims, 8 Drawing Sheets

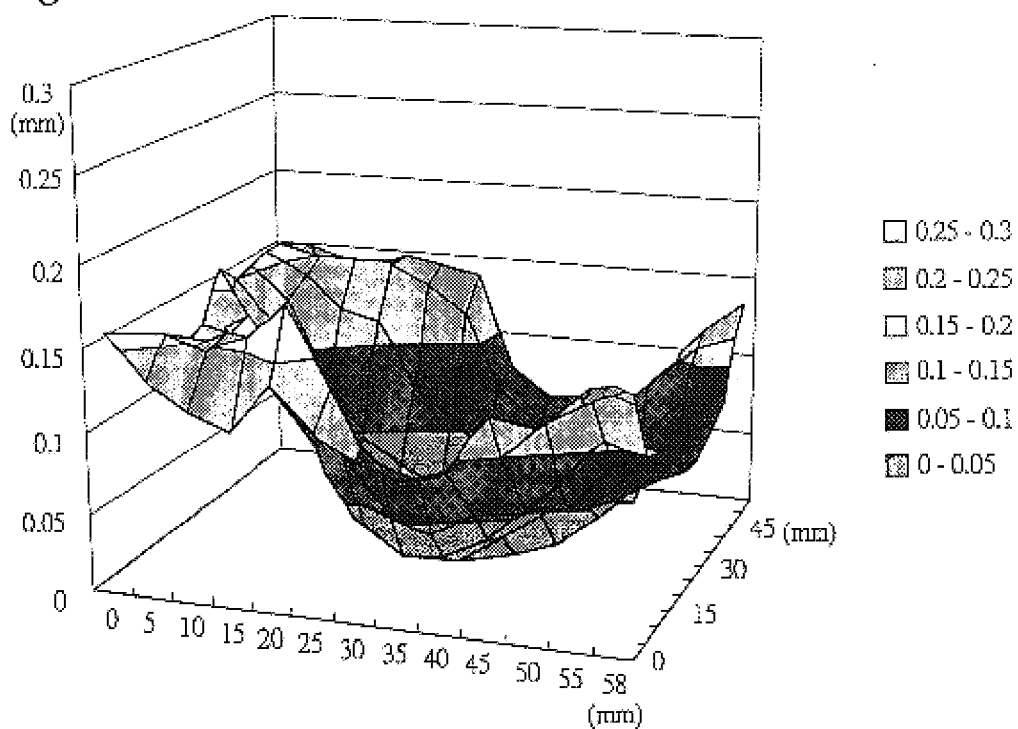
*Fig. 6A* Porous structure without being baked
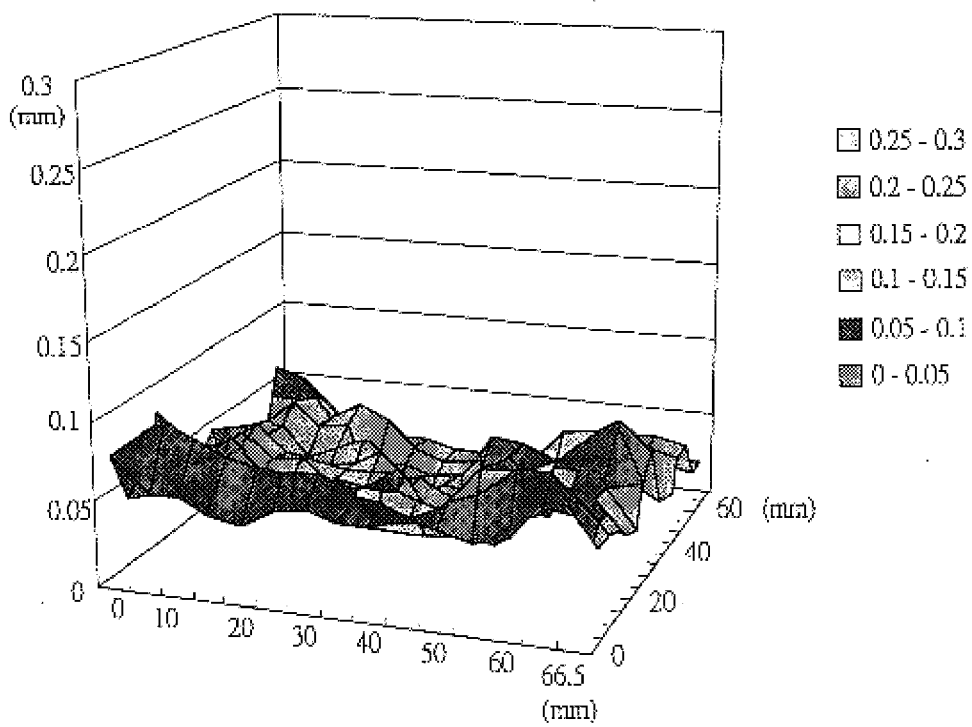
*Fig. 6B* Porous structure baked Three directions Four directions Six directions

SETTER FOR BURNING

BACKGROUND OF THE INVENTION

The present invention relates to a setter for burning, on which ceramic electronic parts are placed in a furnace when these ceramic electronic parts such as ceramic substrates and the like are burned, and particularly to a technique effective in suppressing each warp of multi-layer ceramic electronic parts burned.

In Japanese Patent Laid-open No. 2-74567, such a structure has been disclosed that since friction against a setter causes drawbacks of dispersion in the shrinkage rate and cracks and the like of a ceramic substrate in a process of burning the ceramic substrate, the ceramic substrate is floated by air during burning in order to prevent such drawbacks from be caused.

In such the structure, a microporous setter is always placed on an air intake auxiliary setter provided with air intake holes. Under this condition, the ceramic substrate is placed on the microporous setter and burned. During burning, air is supplied from the air intake holes of the air intake auxiliary setter and blows from micro-holes of the microporous setter toward a lower surface of the ceramic substrate and thereby causes the ceramic substrate to be floated.

In this structure, since the ceramic substrate is made apart from the setter during burning, the drawbacks such as shrinkage, cracks and the like of the ceramic substrate in burning are greatly suppressed, which have arisen previously.

In Japanese Patent Laid-open No. 11-79853, such a means is disclosed as to prevent contamination of burned products, which is caused by contact failure between the burned products and a setter during burning of electric material parts such as ceramic multi-layers or the like, and to prevent occurrence of inferior goods caused by adhesion between the burned products and the setter.

The above-mentioned means discloses a tape-forming method using a doctor blade method or the like so as to be able to manufacture thin setters by utilizing slurry, and the cited reference discloses a structure of the thin setter whose thickness is set to be 0.2 to 2 mm from a tape-forming point of view. The setter discloses a structure in which independent through holes are provided by a method like punching or the like of each contact surface between the burned products and the setter in order to be able to situate electric material parts such as ceramic substrates in nearly point contact manner. The setter is formed in a thin mesh shape, in which opening portions piercing a thin plate are provided.

From a point contact point of view, there is description in which one of the independent through holes has preferably an opening area set to be within a range of 0.07 to 36 $mm^2$. It is also described that each opening ratio of the through holes is preferably within a range of 10 to 60% from a viewpoint of adhesive possibility between the setter and each through hole and of facility of a process of punching the through holes. Further, it is described that sintered density of the setter is set to be preferably 95% or more from a viewpoint of the strength the setter.

Japanese Patent Laid-open No. 5-270926 discloses a manufacture of lightweight setters having small thermal capacity by vesicating and hardening in a mold a mixture adding a polyurethane foam raw material to a mixture made of a ceramic powder and water, and thereafter by burning the mixture.

However, such a problem is pointed out that if ceramic electronic parts such as ceramic substrates and the like are situated on the setter having the above-mentioned structure and are burned, then characteristics of the ceramic electronic parts are deteriorated. As a means for solving the problem, from a viewpoint of replacement facility of peripheral atmospheres surrounding ceramic molds, the strength thereof and the like, it is disclosed that each ceramic mold is provided with one to ten through holes per 1 $cm^2$ of each placement area thereof.

Japanese Patent Laid-open No. 6-281359 discloses such a structure that a setter on which each of electric material parts such as ceramic substrates and the like are situated and burned is provided with an uneven surface placement portion for situating the electric material parts such as ceramic substrates.

Japanese Patent Laid-open No. 5-267010 discloses a structure of a pot, which is used during manufacture of voltage nonlinear resistance members primarily containing zinc oxide, composed of a pot body provided with an opening portion therein and a separate porous plate setter provided on this opening portion. Therefore, the cited reference discloses that, even in the case where a plurality of pots formed by situating the voltage nonlinear resistance members on the porous plate setter is piled up in a furnace and is burned, dispersion of a varistor characteristic greatly affected by a burning atmosphere is decreased by making the burning atmosphere per pot as uniform as possible.

SUMMARY OF THE INVENTION

As mentioned above, various structures have been proposed about a ceramic setter for putting the ceramic electronic parts in a furnace, in order to suppress the occurrence of warp or the like of the ceramic electronic parts burned to the utmost. However, at present, the warp problem of the burned ceramic electronic parts has not been sufficiently solved yet. For example, although solution of the warp problem is effectively improved by making the opening ratio increase, the strength of the setter is lowered and if heat and cool treatment is repeatedly performed in the furnace, it is easy for the setter itself to warp. This is reflected to each quality of the ceramic electronic parts resultantly.

The ceramic setter is preferably considered to be burned without having an interaction between the ceramic setter and the ceramic electronic parts situated thereon, that is, giving any affect to the ceramic electronic parts. It is preferable that the ceramic electronic parts are simply situated so that burning behavior such as shrinkage based on the characteristics proper to the ceramic electronic parts is executed.

An object of the present invention is to provide a setter for burning, which can ensure the burning behavior based on characteristics proper to ceramic electronic parts, particularly, ceramic electronic parts having a multi-layer structure such as chip condensers, high frequency module parts and the like.

The above-mentioned and other objects and novel characteristics of the present invention will be apparent from the description of this specification and the accompanied drawings.

When the present inventors develop satisfactorily ideal setters for burning, they have observed in detail each warp amount of ceramic electronic parts burned by utilizing both a conventionally used typical setter for burning and a satisfactorily ideal one. And the inventors have tried to solve problems based on observed results.

Additionally, the inventors have thought that, in a relation between the setter for burning and the ceramic electronic part situated thereon, it is necessary to determine what evaluation standards the proper setter for burning should satisfy.

According to conventional evaluation standards, it is ideal that the warp amount of the burned ceramic electronic part is zero, and the validity of a ceramic setter is determined in comparison with the magnitude of each warp amount at a zero standard. However, the inventors have thought that it is necessary to determine the warp amount by using as a standard such a state that the ceramic electronic part is burned without being affected from the setter.

This is taken up as a large problem of a warp caused after the conventional ceramic electronic part is burned, and various proposals have been made, for example, by an improvement or the like in electroconductive paste as problems of the ceramic electronic part itself.

However, even if technology capable of achieving the warp state of zero in the burned ceramic electronic part itself is developed, in the case where the warp of the ceramic electronic part burned is caused by being affected from the setter at a burning stage thereof like the conventional setter, search of the cause for solving the warp state of zero of the ceramic electronic part burned complicates. Therefore, it is sufficiently thought that there arises such apprehension that the valid technology can not be developed as desired.

For this, the inventors speedily promote the technology development for achieving the warp state of zero of the ceramic electronic part burned by eliminating the interaction between the ceramic electronic part and the setter for burning to the utmost, and have thought that it is necessary to reexamine the evaluation standard of the setter for burning from a viewpoint of no influence on the burning behavior which the ceramic electronic part possesses originally.

The inventors have evaluated a valid property of various ceramic electronic parts by using as a evaluation standard the warp state of the ceramic electronic part burned, and thereby have developed a setter which affects a little the ceramic electronic part to be situated thereon.

According to the present invention, a setter for burning, which a ceramic electronic part is situated in a burning furnace when said ceramic electronic part is burned, comprises: an external wall; an electronic part placement surface for situating said ceramic electronic part thereon; and an in-furnace placement surface for situating said setter for burning in said burning furnace, wherein said setter for burning has a honeycomb structure in which a plurality of ventilation cells that is formed by each partition wall having a thickness of 0.05 to 1.0 mm and that are each partitioned in a pitch of 0.5 to 5.0 mm passes through between said electronic part placement surface and said in-furnace placement surface.

In this case, for example, a ceramic multi-layer substrate formed by piling up and laminating a plurality of green sheets each having a thickness of several $\mu$m to several tens in is given as the above-mentioned ceramic electronic part. However, the above-mentioned ceramic electronic part does not require being limited to the ceramic multi-layer substrate, and, needless to say, may be a ceramic mold other than it. Moreover, even if being a metal, if being a mold for burning, which consists of powder thereof and organic materials, then the above-mentioned setter for burning, which is the present invention, can be utilized effectively.

The setter for burning, which has the above-mentioned structure, may have a honeycomb structure, for example, by forming such a plate-shaped member having an external wall of an almost square that a front surface thereof is a electronic part placement surface for situating the ceramic electronic part thereon and that a rear surface is an in-furnace placement surface, and by providing through holes capable of being ventilated from the front surface toward the rear surface to form ventilation cells.

In a burning furnace, a binder and the like included in the ceramic electronic part are burned, converted into gases such as $CO$, $CO_2$ and $H_2O$, and scattered. In the state that the ceramic electronic part is situated on the setter for burning, an external surface of the ceramic electronic part except for a surface of a side situated on the setter for burning becomes a free plane to which oxygen required for the scatter of the gases and for the combustion of the binder is supplied relatively freely.

However, in view of the supply of oxygen and the scatter of gases, oxygen can be supplied through the ventilation cells or the gases can be scattered through the ventilation cells, even in a side of the in-furnace placement surface of the setter for burning, which is easy transferred into a restricted state in comparison with the above-mentioned free plane. Therefore, in comparison with the case where the above-mentioned constitution is not provided, gasses of the binder or the like from the ceramic electronic part are scattered on average, so that an influence on shrinkage of the ceramic electronic part can be suppressed due to scattering on average.

As described above, because the ventilation cells strongly affect the shrinkage of the ceramic electronic part, situations for setting the ventilation cells have been examined.

For example, as shown in FIG. 8A, the ventilation cells may be constituted such that the adjacent cells thereof are partitioned by partition walls each having a thickness of 0.05 to 1.0 mm in at least three directions from a crossing section of three partition walls. FIGS. 8B and 8C illustrate the cases where four and six directions are partitioned, respectively. Additionally, a pitch between the adjacent ventilation cells may be set to be 0.5 to 5.0 mm. The cell pitch in these cases means a distance between the respective centers of the partition walls. For various cell shapes, the cell pitch may be defined as a distance between the partition walls corresponding to respective cells. Or a distance between the centers of respective cell spaces may be defined as the cell pitch.

As to the thickness of the above-mentioned partition walls, if each of them is set to be less than 0.05 mm when the above pitch is kept, then each opening area of the ventilation cells can increase due to the setting. However, it is not preferable that there arises such apprehension that a fragile property in strength thereof is brought about when the ceramic electronic part is situated or when the setter for burning is handled. On the other hand, if the thickness is set to be greater than 1.0 mm, each opening area of the ventilation cells decreases due to the setting. Therefore, there arises such apprehension that each function of the ventilation cells decreases relative to the oxygen supply and the gas scatter depending on the ceramic electronic part. The thickness thereof is more preferably 0.1 to 0.5 mm and still more preferably 0.1 to 0.2 mm.

Also, as to the above-mentioned cell pitch, if each cell pitch is set to be less than 0.5 mm when each thickness of the above-mentioned partition walls is kept, then the scattered gases are difficult to pass through before individual cells decrease in size. In addition, an area of each inside surface of the cells per opening ratio in a total of the ventilation cells increases, and probability of adsorption of the gases to each inside wall surface of the cells increases when the gases is scattered. The setter for burning is usually used repeatedly many times. Therefore, in the case where the gases-adsorption phenomenon occurs, it is necessary to carry out baking before the setter is used and to completely oxidize a reducing gas such as CO or the like to scatter the gases. This results in the cause of extra labor and time. A constitution requiring no process such as baking is desirable.

If the cell pitch is set to be larger than 5.0 mm, the opening area per ventilation cell increases, and there also occurs the case where there arises such apprehension that when a small type electronic part is situated, it falls from the setter for burning. The cell pitch is more preferably 0.8 to 3.0 mm and still more preferably 1.0 to 2.5 mm.

A cross-sectional shape of each ventilation cell defined by the above-mentioned cell pitch and the above-mentioned thickness of each partition wall can be easily formed by using molds configured for a honeycomb shape. For example, the cross-sectional shape may be made into an almost square. Such the cross-sectional shape may be designed to be an optional polygon such as a rectangle, lozenge, hexagon, octagon or th like.

Further, if an opening ratio, which is a ratio of the total opening area of said plurality of ventilation cells to the total area of said electronic part placement surface, is 50 to 90%, then more preferable results in view of oxygen supply ability and gas scatter ability can be obtained. The opening ratio is more preferably within a range of 60 to 90% and may be still more preferably 70 to 90%.

The setter for burning, which has the above structure according to the present invention, may be provided with a supporting member having a predetermined height in a side of the in-furnace placement surface. By providing the supporting member, the side of the in-furnace placement surface for situating the setter for burning can be provided apart from the inside of the furnace. By providing the side of the in-furnace placement surface apart from the inside of the furnace, air freely goes in and out from the side of the furnace placement surface unlike the case where the setter for burning is solid situated without providing the side of the in-furnace placement surface apart from the inside of the furnace.

Due to this, when the ceramic electronic part situated on the setter for burning is burned, oxygen amounts required for burning binders and plastic materials in the ceramic electronic part can be satisfactorily ensured from the in-furnace placement surface. By this, stay of incomplete combustion gas such as CO or the like, which affects the warp and the like of the ceramic electronic part burned, does not occur, either.

Also, by providing the supporting member to go freely air in and out from a side of the in-furnace placement surface, it is possible to ensure passages for easily passing combustion gas such as the binders, the plastic materials and the like included in the burned ceramic electronic part to be situated on the setter for burning. In this manner, by providing the supporting member on the side of the in-furnace placement surface, effects such as ensuring of the oxygen amounts and the passage for the combustion gas and the like can be obtained. In order to make the effects valid, height of the supporting member may be set to be 1 mm or more and 10 mm or less.

When the height is less than 1 mm, permeability such as the oxygen amounts, the passages for the combustion gas and the like can be insufficiently ensured. It is unnecessary that any limitation on the height of the supporting member is set from a viewpoint of ensuring of the permeability. However, it is reasonably preferable to set the upper limitation within a certain range taking it into consideration that an actual operation is carried out in the furnace. For instance, when the setter for burning is utilized, there is the case where setters for burning are piled up into a multi-stage structure at site. From a viewpoint of a valid utilization of an inside space of the furnace in such the situation in use, it is appropriate to set the height of the supporting member to be 10 mm or less and more preferably 5 mm or less.

Installing positions of the supporting member in the side of the in-furnace placement surface, for example, may be four corners Or, by forming the supporting member in a bar shape, such bar-shaped supporting members may be arranged with each a given space under a side of the in-furnace placement surface, that is, may be provided like teeth of clogs. Alternatively, the supporting member may be provided such that supporting portions are integrated with the setter for burning. In short, if gas permeability between the side of the in-furnace placement and the inside of the furnace can be ensured, it is not particularly necessary to limit the shapes and the installing positions of the supporting members.

In the setter for burning, as described above, it is desirable to use materials having a large porosity so that the oxygen supply, the gas scatter and the like can be satisfactorily ensured. However, a material having a larger porosity than required is considered to result in the case where the strength required for the setter for burning within a general operational range cannot be ensured. In the structure in which the ventilation cells are provided as through-holes as mentioned above, there arises such strong apprehension that the strength thereof decreases. It is therefore required to provide the upper limit of the porosity relative to each ventilation cell. The porosity may be 70% or less from this pint of view. On the other hand, if the porosity is less than 15%, contribution of gaps to the oxygen supply and the gas scatter becomes small. It is therefore required to increase the opening ratio in order to ensure the oxygen supply and the gas scatter to be obtained by the ventilation cells due to the contribution, and it is not desired to cause reduction in strength thereof on the contrary. The porosity is more preferably 20 to 60%.

Here, although it is effective to set the opening ratio and/or the porosity to be higher values, there arises such apprehension that the strength thereof is reduced at the same time. For this, by providing R portions each having a size of 0.1 mm or more at each crossing section between the partition walls of the ventilation cells, it is desirable to compensate for the reduction thereof in strength. In this case, the size of each R portion is provided properly by taking the thickness of each partition wall, the pitch, the opening ratio and the like into consideration.

The inventors have considered under what states the ceramic electronic part is situated on the setter for burning. As a result, it has been confirmed that the surface roughness is preferably smaller in the condition that the opening ratio is made large enough to ensure an atmosphere suitable for the above-mentioned oxygen supply and the gas scatter, whereas the surface roughness is preferably larger in the case where the above atmosphere is not ensured.

It is estimated that in the condition that if an acidic atmosphere such as the oxygen supply or the like is insufficiently ensured, then the situated state can be closer to a point contact state than to the solid situated state by increasing the surface roughness of the setter for burning and the oxygen supply circumstance is thereby improved to that extent, so that desirable results can be obtained. That is, when the above-mentioned acidic atmosphere is insufficiently kept, the magnitude of the surface roughness affects greatly.

As to the surface roughness of the surface on which the electronic part is situated and which is constituted by the partition walls of the ventilation cells, it is desirable that the maximum height (Rmax) be 1 μm or more and 100 μm or less and the center line average roughness (Ra) be 0.5 μm or more and 50 μm or less. It is more preferable that the maximum height (Rmax) be 2 μm or more and 60 μm or less and the center line average roughness (Ra) be 1 μm or more and 10 μm or less. The surface roughness may be measured on the basis of the definition and indication of surface roughness in JIS Standard B 0601.

Also, when ceramic molded products such as ceramic electronic parts are situated on the setter for burning, the ceramic molded products burned results in a burned state in accordance to the undulation of the surface on which the electronic parts are situated if the molded products are solid situated on the electronic part placement surface of the setter for burning. Therefore, the electronic part placement surface is preferably as flat as possible. From this point of view, the flatness of the electronic part placement surface is preferably 50 μm or less. The flatness is more preferably 20 μm or less. In this case, the flatness may be measured in accordance with the definition and indication of geometrical deviation in JIS Standard B 0621.

The side of the electronic part placement surface is preferably processed within the above-mentioned range by using the acidic atmosphere in the furnace in this manner. However, on the other hand, the side of the in-furnace placement surface does not necessarily require accuracy. When the setter for burning is directly placed on the inside of the furnace without using the supporting members, it is preferable that the ground plane be rather coarse and it is necessary that the flatness is 50 μm or more and it is said to be preferable that the flatness be 500 μm or more.

If the thermal expansion coefficient of the setter for burning is designed to be $1.5 \times 10^{-6}/°$ C. or less, for example, $0.3 \times 10^{-6}$ to $0.5 \times 10^{-6}/°$ C., heating and cooling are accelerated in burning the ceramic electronic parts as be desired. The gradient of a rise in temperature of the furnace and the gradient of the drop of temperature are increased, and thereby each operation time can be shortened.

In every one of the above-mentioned structures, the above-mentioned setter for burning may be formed of cordierite ceramics, alumina ceramics, zirconia ceramics or the like. The cordierite ceramics are characterized by the inclusion of 40 to 60% by weight of $SiO_2$, 25 to 50% by weight of $Al_2O_3$ and 10 to 20% by weight of MgO.

BRIEF DESCRIPTION OF THE DRAWINGS

FIG. 6A is an explanatory view showing the warp condition of the ceramic multi-layer substrate burned in the case of reuse of the conventional porous setter for burning without baking.

FIG. 6B is an explanatory view showing the warp condition of the ceramic multi-layer substrate burned in the case of reuse of the conventional porous setter for burning after baking.

DETAILED DESCRIPTION OF THE PREFERRED EMBODIMENTS

Figure 1A:
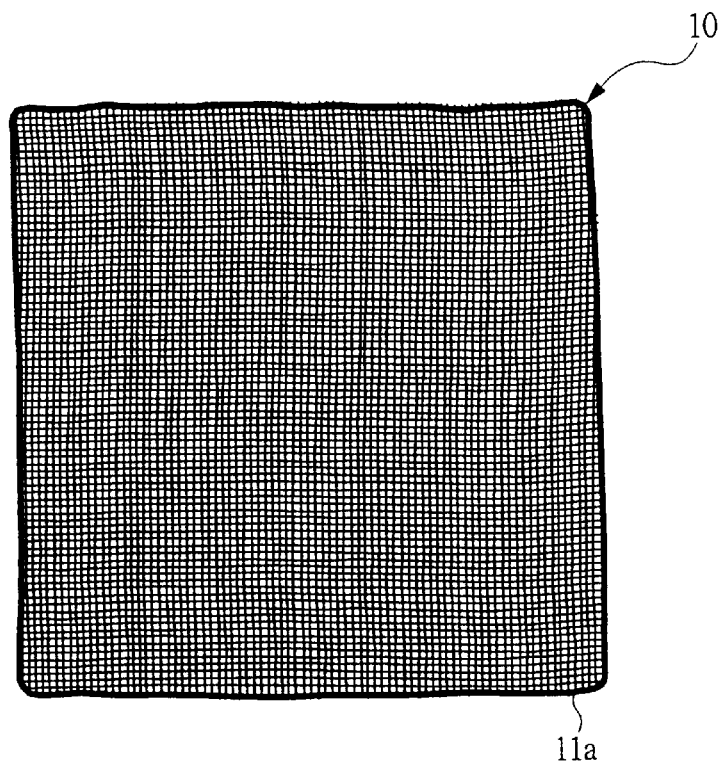
FIG. 1A is a plan view showing one embodiment of a setter for burning, which is the present invention, from above.
Figure 1B:
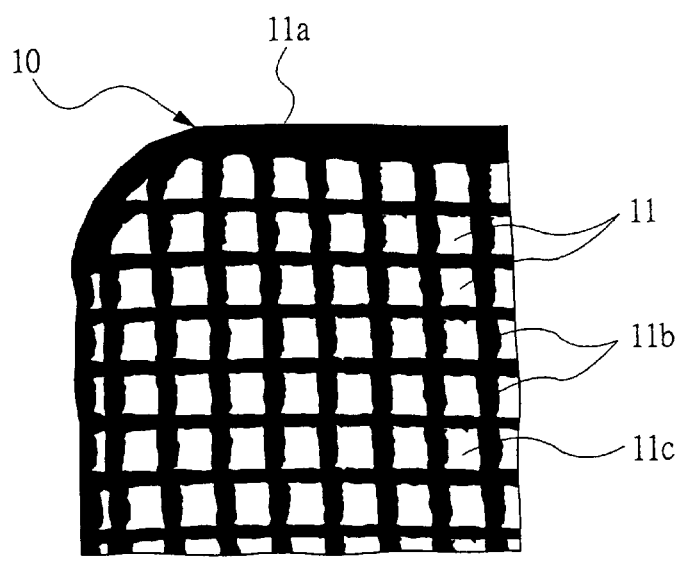
FIG. 1B is a partially enlarged view showing an enlarged corner portion of FIG. 1A.
Figure 1C:
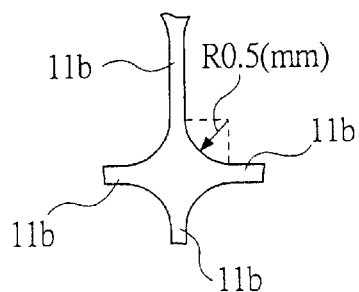
FIG. 1C is a partially enlarged view showing an R portion provided at a crossing section of partition walls of a cell.
Figure 2:
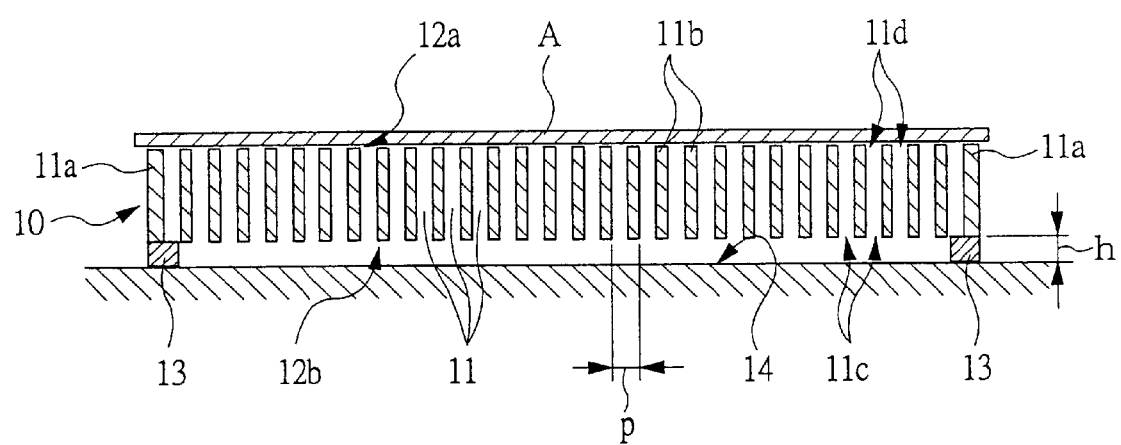
FIG. 2 is a cross-sectional view of a setter for burning, which is the present embodiment.

Embodiments according to the present invention will be explained in detail with reference to the drawings. FIG. 1A is a plan view of one embodiment of a setter for burning, which is the present invention, from above. FIG. 1B is a plan view enlarging a corner portion of the setter for burning as shown in FIG. 1A. FIG. 1C is a partially enlarged view showing the s state that an R portion is provided at a crossing section of partition walls. FIG. 2 is a cross-sectional view showing the state that a ceramic multi-layer substrate as a ceramic electronic part is situated on the setter for burning, which is the present invention.

The setter for burning 10 of the present invention is formed of an external wall 11a formed like an almost plate-shaped square and partition walls 11b by using cordierite ceramic as shown in FIG. 1A and FIG. 1B. The cordierite ceramic having a composition of 42 to 56% by weight of $SiO_2$, 30 to 45% by weight of $Al_2O_3$ and 12 to 16% by weight of MgO may be used. If the cordierite ceramic has the above-mentioned composition, then the coefficient of thermal expansion thereof can be set to be $1.5 \times 10^{-6}/°$ C. or less and the porosity of the setter for burning after being molded can be set to be within the range of 15 to 70%.

The setter for burning is, as shown in FIG. 2, provided with ventilation cells 11 as through holes extending from a side of a front surface 12a of the electronic part placement surface for situating a ceramic electronic part A, toward a side of rear surface 12b. Supporting members 13 are provided on the side of the rear surface 12b, so that the rear surface 12b of the setter for burning 10 is not solid situated inside the furnace.

The plurality of ventilation cells 11 are, as shown in FIG. 1A, provided within the almost square surrounded by the external wall 11a. The ventilation cells 11 adjacent to one another are partitioned by the partition walls 11b having a thickness of 0.05 mm to 1.0 mm and a cell pitch p between the ventilation cells 11 is set to be 0.5 to 5.0 mm. The external wall 11a is set to be thicker than each partition wall 11b, so that that is useful to ensure the strength of the setter for burning 10. The minimum strength thereof in actual use may be set for the external wall 11a to have a thickness of at least 0.10 mm or more, preferably 0.25 mm or more.

By providing the supporting members 13 to prevent the setter for burning from being solid situated, it is easy for gas passing from the side of the front surface 12a to the side of the rear surface 12b to be diffused more around. Or, it is possible to make it easy for air to flow toward an opening surface 11c of each ventilation cell 11 located at the side of the rear surface 12b, from circumference thereof. However, in the case where there arises no fear such that each opening surface 11c of the ventilation cells 11 located on the side of the rear surface 12b is not clogged, such a structure that the supporting members 13 are not needed may be utilized.

Each of the supporting members 13, for example, may be provided at four corners of the setter for burning 10 formed like an almost plate square, or may be provided intermittently along side portions thereof, or may be integrated with the setter for burning. In short, the supporting members 13 may be provided such that the opening surface of each ventilation cell 11 located on the side of the rear surface 12b of the setter for burning 10 is floated from a setter placement surface 14 in the furnace and that permeability between the setter for burning 10 and the peripheral atmosphere thereof is intercepted.

The height h of each supporting member 13 may be set to be at least 1 mm or more in order to ensure the permeability between the side of the rear surface 12b and the setter placement surface 14 from a-viewpoint of gas vaporization and oxygen supply. With regard to the height h of each supporting member 13, it is unnecessary to provide an upper limit from a viewpoint of obtainment of the permeability, as mentioned above. However, the height h is preferably set to be 10 mm or less at most, by considering utilized conditions of the setter for burning in manufacture. If the height is set to be 10 mm or less, space in the furnace can be effectively utilized even when a number of setters for burning are piled up like a multi-stage in the furnace. The height is more preferably 2 mm or more, or 5 mm or less.

When each thickness of the partition walls 11b and the cell pitch p are respectively set in the above-mentioned manner, the ratio (hereinafter referred to as "opening ratio") of the total area of each opening surface 11d of the ventilation cells 11, to a surface for situating the ceramic electronic part is 50 to 90%. Also, the coefficient of thermal expansion is $0.3 \times 10^{-6}$ to $0.5 \times 10^{-6}$/° C. and even rapid heating (5° c./min or more) and rapid cooling (5° C./min or more) cause no cracks.

The setter for burning 10 having the above-mentioned structure may be manufactured in the following manner. Specifically, cordierite raw materials such as kaolin, talc, alumina, silica and the like are blended in order to obtain the above-mentioned composition, and thereafter a binder and a plasticizer are added thereto. These are mixed, kneaded and extrusion-molded to form a setter molding. Thereafter, by burning at 1300 to 1500° C., a setter for burning composed of cordierite ceramics may be manufactured. In this case, it is possible to regulate the coefficient of thermal expansion and the porosity thereof by controlling grain shapes and particle size distribution of the cordierite raw materials.

By using the setter for burning 10 having such the structure, a ceramic multi-layer substrate A (a square of 45 mm×58 mm with a thickness of 1 mm) as the ceramic electronic part is burned to investigate the condition of a warp thereof. The ceramic multi-layer substrate A has such a structure as to laminate ceramic green sheets and electroconductive paste alternately. Each of the ceramic green sheets is made from a low burning ceramics consisting of $Al_2O_3$, $SiO_2$ or the like, a binder and a plasticizer, and is generally and often utilized. And, the electroconductive paste is made from an Ag powder, a binder and an organic solvent and has a conventional structure.

As shown in FIG. 2, the ceramic multi-layer substrate A formed in this manner is situated on the setter for burning 10 with a packaging surface thereof facing upward, and is baked at 900° C. in the furnace. In the burning process, temperature is raised up to 600° C. in 10 to 15 hours, and the ceramic multi-layer substrate A is kept at 600° C. for one hour, and thereafter is burned at 900° C. for one hour.

Figure 3:
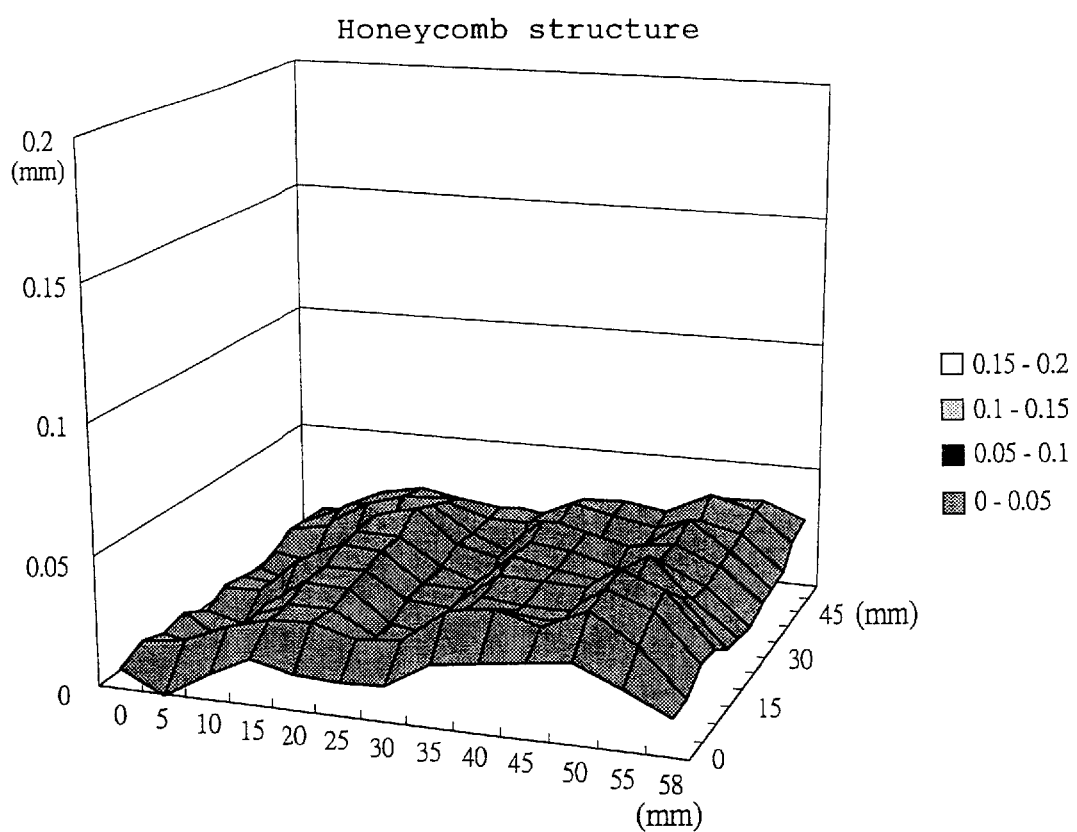
FIG. 3 is an explanatory view showing a warp condition of a ceramic multi-layer substrate burned in the case of use of a setter for burning, which has a honeycomb structure and which is the present embodiment.

In the above-mentioned ceramic multi-layer substrate burned, as shown in FIG. 3, each warp having a little unevenness on a package surface thereof has been partially seen, that is, seen to become convex within a range of 0 to 0.05 mm as a whole.

Figure 4:
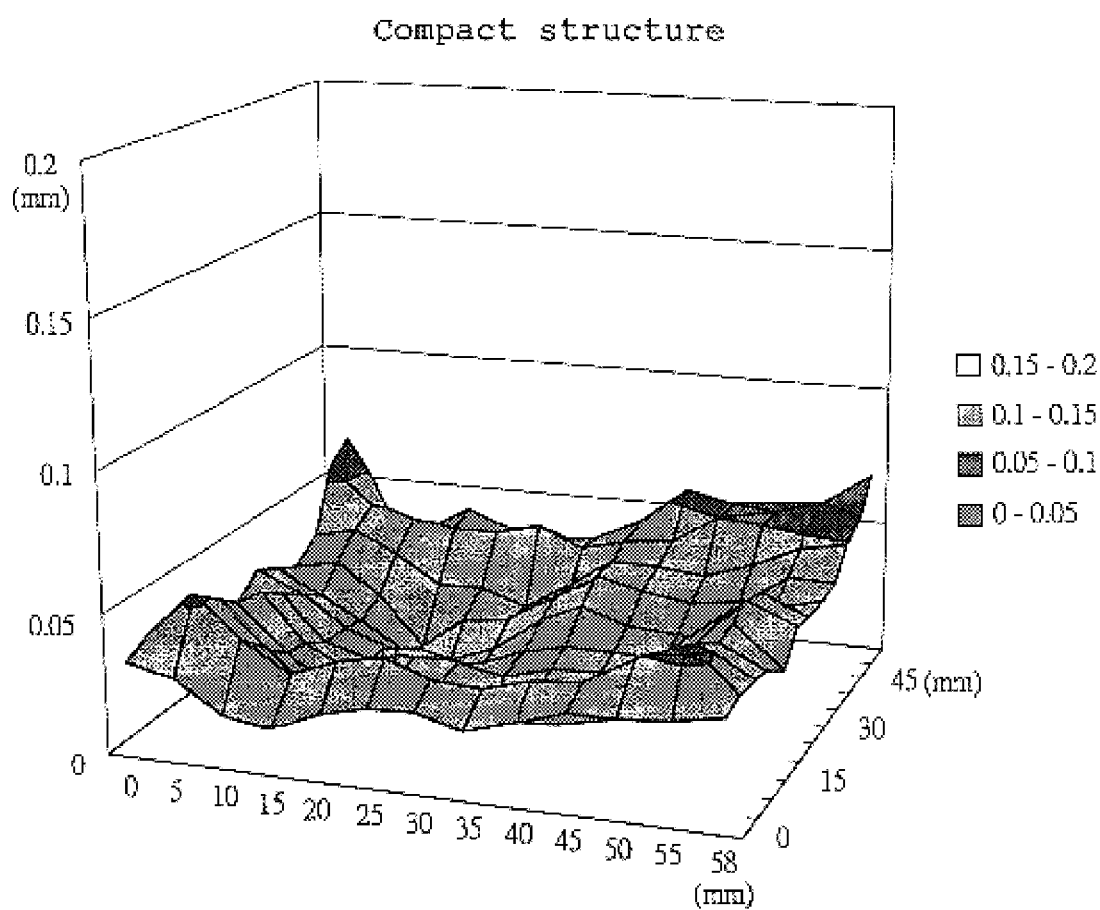
FIG. 4 is an explanatory view showing a warp condition of a ceramic multi-layer substrate burned in the case of use of a conventional compact setter.

A setter for burning, which uses a conventionally known compact materials having a porosity of 5% or less and which is composed of alumina, is formed. By using this setter for burning, the ceramic multi-layer substrate A is burned at 900° C. in the same manner as above. Warp condition of the ceramic multi-layer substrate A burned is shown in FIG. 4.

In this case, warp amount of ceramic multi-layer substrate A exists almost within a range of 0 to 0.05 mm. However, parts of the ceramic multi-layer substrate A, that is, four corners thereof each show a relatively high warp amount of a range of 0.05 to 0.1 mm. This case differs from the case of use of the setter for burning, which is the present invention, as shown in FIG. 3 in that the warp direction of the ceramic multi-layer substrate A is reversed.

Figure 5:
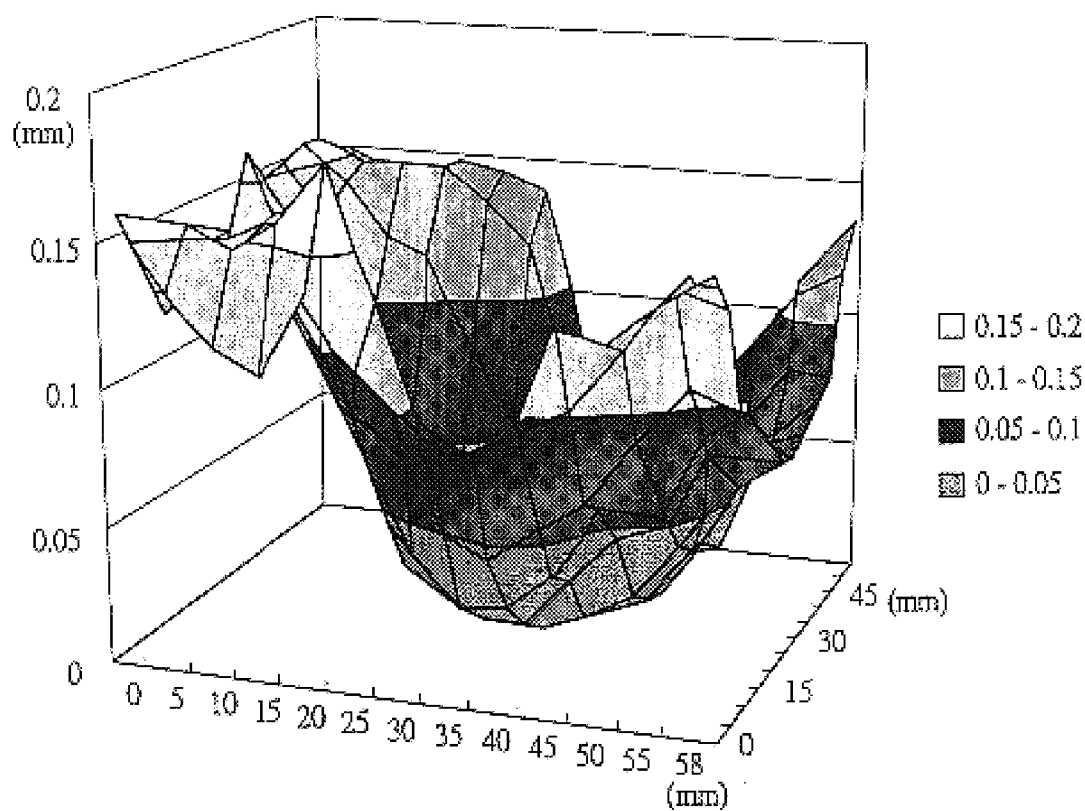
FIG. 5 is an explanatory view showing a warp condition of a ceramic multi-layer substrate burned in the case of use of a conventional porous setter for burning.

The case shown in FIG. 5 is different from the setter for burning, which is the present invention, and shows a warp condition of the ceramic multi-layer substrate A under the case where the porous setter for burning, which has no ventilation cell passing therethrough and which has a porosity of 70%. It is understood that the packaging surface thereof is largely warped like a concave as a whole. With substantially center portion of the ceramic multi-layer substrate bottom, a periphery thereof shows such a warp condition as to pulled up in an upper direction. Each of the four corners shows a high warp amount of a range of 0.1 to 0.15 mm, wherein parts of the warp amount each show the maximum warp amount ranging 0.15 to 0.2 mm as illustrated in the drawing by white-painted shapes.

It has been confirmed that even a porous setter for burning, which is generally estimated to be more decreased in warp than a compact one, exhibits the high warp amount like this. It is considered that, in the case of the porous one, gas generated when the binder included in the ceramic multi-layer substrate burns is not burned completely and is absorbed in the porous one with reductive property thereof. The adsorbed gas is thought to give bad affection to reuse of the setter for burning.

In view of this situation, the inventors have examined, in the case of reuse of the porous setter for burning, respective warp amounts influenced by a method of baking and then completely baking the above-mentioned reducing gas absorbed and eliminating the reducing gas from the porous structure in advance, and by a method of reusing the reducing gas without using the above-mentioned method. In the case where no baking is performed, a large warp condition is observed as shown in FIG. 6A. On the other hand, in the case where baking is performed in advance prior to reuse, it is confirmed that the warp amount of the case shown in FIG. 6B is lower than that of the case shown in FIG. 6A.

As shown in FIG. 6B, an effect of the baking can be confirmed. However, it is understood that the warp amount thereof is larger in comparison with the case of the compact one. It is estimated that removal of the reducing gas sufficiently adsorbed cannot be accomplished by the baking.

Figure 7:
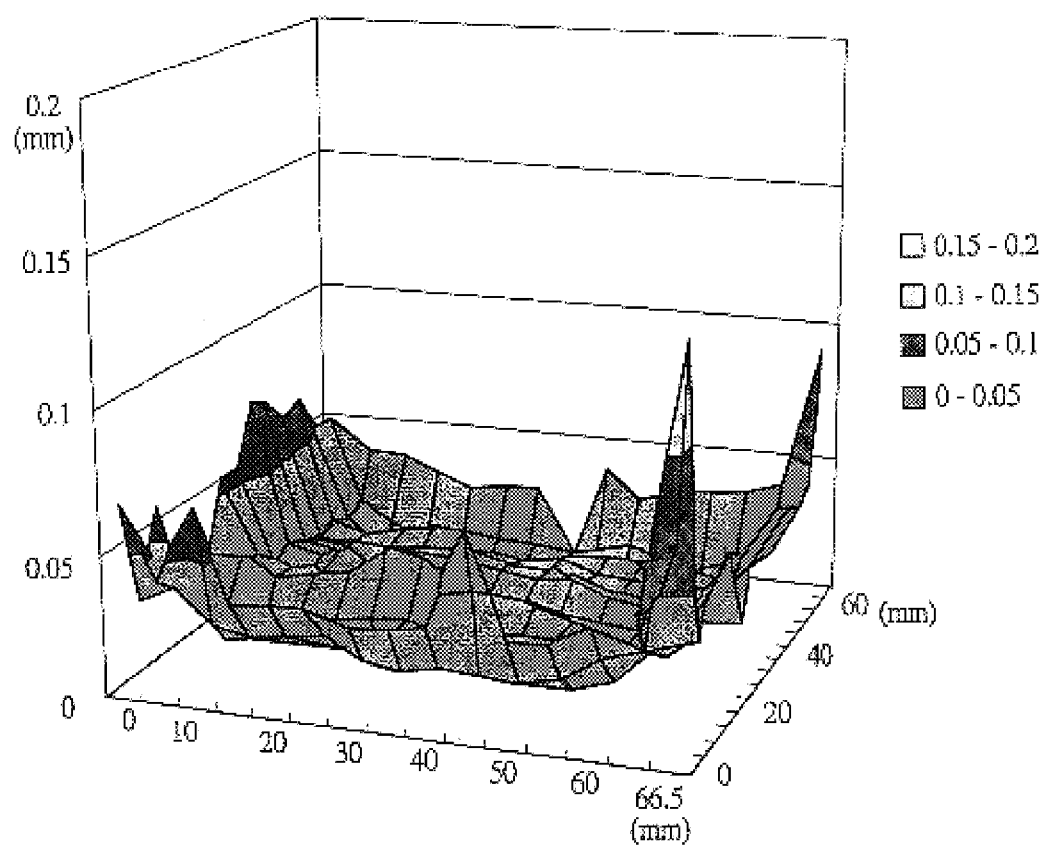
FIG. 7 is an explanatory view showing a warp condition of the ceramic multi-layer substrate in the case where a setter for burning, which has a honeycomb structure and is the present embodiment, is solid situated in a furnace.
Figure 8A:
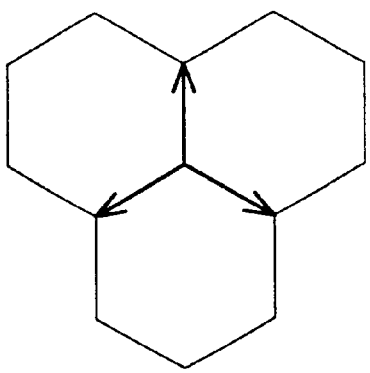
FIG. 8A is a plan view showing the case where cells adjacent to each other are partitioned by partition walls in three directions from the crossing section.
Figure 8B:
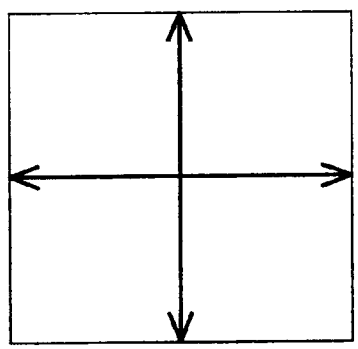
FIG. 8B is a plan view showing the case where cells adjacent to each other are partitioned by partition walls in four directions from the crossing section.
Figure 8C:
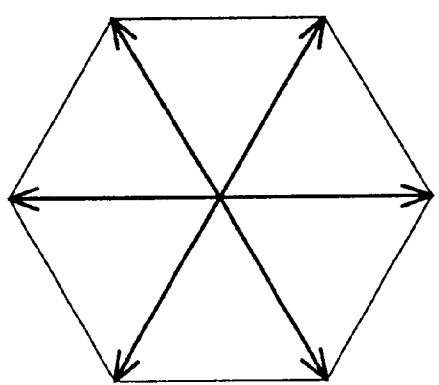
FIG. 8C is a plan view showing the case where cells adjacent to each other are partitioned by partition walls in six directions from the crossing section.

The case shown in FIG. 7 shows a warp condition of the ceramic multi-layer substrate A when the setter for burning, which is the present invention, is solid situated without providing the suspending members 13 in the furnace and then is burned. Even if the same setter for burning, which is the present invention, is used, a side of the packaging surface shows the warp condition similar to the conventional concave structure unlike the case where the supporting members 13 are provided. Additionally, it is also understood that a part of the four corners shows high warp amounts of 0.1 to 0.15 mm in maximum. A large significance of the presence of the supporting members 13 is confirmed again.

As mentioned above, it is considered that the setter for burning, which is the present invention and in which the ventilation cells having a given volume ratio and a given opening ratio is formed by using cordierite ceramic, has a smaller influence on the shrinkage behavior of the ceramic electronic parts to be situated thereon than either the case of a compact or porous one which are conventionally used. From this point of view, it has been confirmed that the ceramic multi-layer substrate burned particularly differs from the setter for burning, which is conventionally used, in a warp direction, and the convex-shaped warp occurs relative to the packaging surface that the ceramic multi-layer substrate used in this experiment is thought to have originally.

Also, the height of a supporting member of the setter for burning, the opening ratio of a ventilation cell provided in the setter for burning, the porosity of a substratum constituting the setter for burning, and the surface roughness (Rmax and Ra) and flatness of the electronic parts placement surface are variously changed to measure the warp amount of each burned product in the case of use of the setter for burning. The results of examination of their influences on the warp amount are shown in Table 1.

TABLE 1

| | Height of supporting member | Opening ratio (%) | Porosity (%) | Surface roughness Rmax | Surface roughness Ra | Flatness ($\mu$m) | Warp amount of burned product: Maximum modified amount ($\mu$m) | Remarks |
|---|---|---|---|---|---|---|---|---|
| Example 1 | 10 | 80 | 40 | 50 | 10 | 10 | 38 | |
| Example 2 | 5 | 80 | 40 | 50 | 10 | 10 | 40 | |
| Example 3 | 2 | 80 | 40 | 50 | 10 | 10 | 45 | |
| Example 4 | 0 | 80 | 40 | 50 | 10 | 10 | 60 | |
| Example 5 | 5 | 60 | 40 | 50 | 10 | 10 | 47 | |
| Example 6 | 5 | 80 | 60 | 50 | 10 | 10 | 35 | |
| Example 7 | 5 | 80 | 40 | 20 | 5 | 10 | 38 | |
| Example 8 | 5 | 80 | 40 | 60 | 20 | 10 | 46 | |
| Example 9 | 5 | 80 | 40 | 50 | 10 | 40 | 43 | |
| Example 10 | 5 | 80 | 40 | 50 | 10 | 2 | 32 | |
| Comparative Example 1 | 5 | 80 | 10 | 50 | 10 | 10 | 109 | |
| Comparative Example 2 | 5 | 80 | 80 | 50 | 10 | 10 | Setter was broken. | |
| Comparative Example 3 | 5 | 95 | 40 | 50 | 10 | 10 | Setter was broken. | |
| Comparative Example 4 | 5 | 40 | 40 | 50 | 10 | 10 | 155 | |
| Comparative Example 5 | 5 | 80 | 40 | 10 | 60 | 10 | Burned product adhered to setter. | |
| Comparative Example 6 | 5 | 80 | 40 | 110 | 60 | 10 | 174 | |
| Comparative Example 7 | 5 | 80 | 40 | 50 | 10 | 120 | 121 | |
| Comparative Example 8 | 0 | 0 | 70 | 50 | 10 | 10 | 145 | Porous structure |
| Comparative Example 9 | 0 | 0 | 2 | 50 | 10 | 10 | 76 | Compact structure |

In Table 1, as mentioned above, a ceramic multi-layer substrate (square of 45 mm×58 mm with a thickness of 1 mm) is used as a product to be burned. In the table, cordierite ceramics are used as explained above in Examples 1 to 10 and Comparative Examples 1 to 7. In Comparative Examples 8 or 9, the substratum has a porous or compact structure.

In Examples 1 to 4, only the height of the supporting member is changed to 0 mm (solid situated), 2 mm, 5 mm and 10 mm under the same condition as the opening ratio of 80%, the porosity of 40%, the surface roughness Rmax of 50 $\mu$m, the surface roughness Ra of 10 $\mu$m, and the flatness of 10 $\mu$m. It is found that as the height of the supporting member is gradually raised from 0 to 10 mm, the warp amount is decreased to 60 $\mu$m, 45 $\mu$m, 40 $\mu$m and 38 $\mu$m respectively.

That is, it is found that if being set to be 60 $\mu$m as a standard at the case of the solid situating, the warp amount is 25%={(60−45)/60}×100 (%) where the height of the supporting member is improved up to 2 mm, and is improved up to about 33% where the height is 5 mm, and is improved up to about 37% where the height is 10 mm. From these results, it is found that to provide the supporting member on the setter for burning can effectively make the warp amount thereof decrease.

As to degree of improvement in the warp amount, change in 2 mm of the height of the supporting member in Examples 4 and 3 brings about an improvement in the warp amount of 25%. That is, a degree of improvement of 25/2 (μm/mm)= 12.5 in the warp amount is obtained. On the other hand, a degree of improvement of (33−25)/3≈2.7 in the warp amount is obtained in Examples 3 and 2, and a degree of improvement of (37−33)/5≈0.8 is obtained in Examples 2 and 1. It is found that, as compared with the magnitudes of the degree of improvement, the degree of improvement gradually reaches the limit state thereof in comparison with the case where the supporting member having a height of 2 mm from the solid situated condition is provided. Also, if the magnitude of the warp amount is 45 μM or less, it is within a sufficiently practical level. Although Table 1 shows nothing, it has been confirmed that the warp amount falls within a usable range even if the height of the supporting member is 1 mm.

For this, it is found to be good that the height of the supporting member is 1 mm or more, preferably 2 mm or more. Also, as described above, the height of the supporting member is preferably set to be 10 mm or less in consideration of the case of use of a plurality of setters for burning, which is piled up like a multi-stage structure in the furnace. However, from this table, if the height of the supporting member is within a range of 1 to 10 mm, more preferably, 2 to 10 mm, then the warp amount of the burned product is 38 to 45 μm and can be suppressed up to a practically usable level. An upper limit thereof of 10 mm is a practical value considering keeping effects of the setter for burning, which is the present invention, and using the plurality of setters for burning piled up like a multi-stage structure.

Next, the influence of the opening ratio is investigated. It is found from Examples 2 and 5 in the above table that if other conditions are the same except for the opening ratio, then the warp amount is 40 μm at the case where the opening ratio is set to be 80%, whereas the warp amount is 47 μm at the case where the opening ratio is set to be 60%. That is, it is also confirmed from the table that the larger the opening ratio becomes, the smaller the warp amount becomes.

It has been also confirmed from the experiments made by the inventors that, although Table shows nothing, the warp amount at the opening ratio of 50% is more than at opening ratio of 60% and falls within a sufficiently usable range. On the other hand, although Table shows nothing, it has been confirmed that the strength of the setter for burning can stand against a usual use without any problem up to the opening ratio of 90%, but if the opening ratio is raised more than 90%, there often arises a problem of strength such as breaks or the like at the time of use.

However, the strength thereof is improved by providing a roundness of R 0.5 mm at each crossing portion of the partition walls of the ventilation cells as shown in FIG. 1C, and also the warp of the setter itself can be suppressed. Moreover, it has been confirmed that, as to the strength, if the above-mentioned R portion is at least 0.1 mm or more, the R portion contributes to an improvement in the strength of the setter for burning. A compressive strength thereof relative to the direction of an axis thereof can be kept at 20 MPa or more.

It is also confirmed from the table that, inconsideration of the strength thereof, the opening ratio may be 50% or more and 90% or less, more preferably 60% or more and 80% or less which show satisfactory values in the strength and the warp amount thereof.

As compared with Examples 2 and 6 in Table1, it is found that if other conditions are the same except for the porosity, the warp amount is 40 μm in the case where the porosity is 40%, whereas the warp amount decreases to be 35 μm in the case where the porosity is 60%. That is, it is confirmed that the larger the porosity to be used for the setter for burning becomes, the better the warp amount becomes. Although Table shows nothing, it has been confirmed that the warp amount falls within a practical range even if the porosity is 15%.

In addition, although Table shows nothing, it has been confirmed that the setter for burning can stand against a usual use without any problem up to the opening ratio of 70% from a viewpoint of the strength of the setter for burning, but if the opening ratio is raised more than 70%, there arises a problem of the strength such as breaks or the like of the setter for burning at the time of use. In consideration of this point, it is confirmed from Table that the porosity may be 15% or more and 70% or less, more preferably 20% or more and 60% or less which show satisfactory values relative to the strength and the warp amount thereof.

It has been also confirmed from Examples 2, 7 and 8 of Table 1 that, if such conditions are the same that the opening ratio is 80% and the porosity is 40% and an acidic atmosphere can be sufficiently ensured, then the warp amount is 46 μm in the case where Rmax and Ra of the surface roughness each are 60 and 20, and the the warp amount is 38 μm in the case where Rmax and Ra of the surface roughness each are 20 and 5. From these results, if the above-mentioned conditions is the same, the smaller the surface roughness of the electronic part placement surface becomes, the smaller the warp amount becomes with the acidic atmosphere ensured.

As compared with Examples 2, 9 and 10 in Table, it is found that, if other conditions are the same, the warp amount is 32 μm in the case where the flatness is 2 μm, whereas the warp amount is 40 μm in the case where the flatness is 10 μm and the warp amount is 43 μm in the case where the flatness is 40 μm. That is, it has been confirmed that the larger the flatness of the electronic part placement surface becomes (as values in Table becomes small, the surface flatness becomes large), the more preferable the setter for burning becomes. Although Table shows nothing, even in the case where the flatness is 50 μm, the warp amount of the burned product falls within a practical range.

It is found from this result that if the flatness of the electronic part placement surface is 50 μm or less, more preferably 20 μm or less, then the warp amount is 32 μm or less and therefore the flatness corresponding thereto is more preferable.

In Comparative Examples 1 to 4, a relation between the opening ratio, the porosity and the strength of the setter for burning will be confirmed. From a viewpoint of the warp amount, it is preferable that the opening ratio becomes larger as described above. However, there is a problem of the available strength of the setter for burning relative to the porosity of the substratum to be used, and the setter for burning tends to be broken at an opening ratio larger than a certain limit. For example, as compared with respective setters for burning, which have porosities of 10% and 80% with the opening ratio 80%, a setter for burning, which has a porosity of 80%, becomes fragile in strength and is broken during manufacture. On the other hand, it has been confirmed that, in the case of a porosity of 10%, there arises no problem of the strength of a setter for burning, which has a porosity of 10%, but as the warp amount thereof is 109 μm, the warp amount of this case is greater than that of all of the above-mentioned cases.

Meanwhile, when the opening ratio increases up to 95% and the porosity decreases down to 40%, breakage of the setter for burning is also caused during manufacture. Next, it has been confirmed that in the case where the opening ratio decreases down to 40% and the porosity decreases down to 40% and the strength of the setter for burning is ensured, no breakage is caused during manufacture, but the warp amount becomes a great value of 155 μm. From the above results, it is estimated that there is a combination of an effective range of the opening ratio and an effective range of the porosity in order that both of the warp amount and the strength fall within an allowable practical range.

In Comparative Example 5 satisfying conditions of an opening ratio of 80%, a porosity of 40%, surface roughnesses Rmax and Ra of 10 and 60 μm and a flatness of 10 μm, adhesion of the burned product to the setter for burning has been observed. It is estimated that this is because since the Rmax is set to be a small value of 10 μm, the contact state between the burned product and the electronic part placement surface is closer to the solid situating than the point contact state based on the surface roughness. From this point of view, it is understood that the surface roughness must be expressed not only by Ra but also by Rmax.

On the other hand, in the case of Comparative Example 6 in which Rmax is increased up to 110 μm under the condition that Ra is kept 60 μm, it has been confirmed that the adhesion of the burned product to the setter for burning is not observed, but the warp amount indicates a remarkably large value.

Also, as compared with Example 3, in Comparative Example 7, only the flatness changes for the worse from 10 μm to 120 μm, but the warp amount increases from 45 μm to 121 μm. From this result, it is found to be preferable that the flatness be better under the condition that the opening ratio, the porosity, the surface roughness and the like are kept the same. Although Table shows nothing, it has been confirmed that if the flatness is 100 μm or less, the warp amount can be suppressed within a range capable of being sufficiently used.

Comparative Example 8 indicates the results obtained in the case where a porous structure having a porosity of 70% and having no ventilation cell is used as materials of the substratum. The warp amount is as large as 145 μm. Further, Comparative Example 9 indicates the case of use of a compact structure, wherein the porosity is only 2% and the warp amount is 76 μm.

In the case where cordierite ceramics having a porosity of 40 to 60% of the present invention is used and set to be within each range of an opening ratio of 60 to 80%, a Rmax of 20 to 50 μm, a Ra of 5 to 10 μm, and a flatness of 2 to 10 μm, the warp amount indicates 60 μm or less lower than respective warp amounts of Comparative Examples 8 and 9. Therefore, the validity of the present invention is confirmed.

Regarding the cases of use of a compact and porous structures, it has been considered at first that the warp amount of the porous structure is smaller than that of the compact one. However, in actual, the warp amount of the compact one has been smaller than that of porous one. It is estimated that this reason is that, as explained above, incomplete combustion gas generated during burning of the products to be burned is adsorbed in pores of the porous structure and therefore sufficient gas exchange cannot be attained.

The present invention is not needed to restrict to explanations of the above-mentioned embodiments and may be changed within departing from the gist of the present invention.

For example, although the case where each entire shape in the above-mentioned explanations is an almost square is explained, this shape may be a circle, other polygons, an undefined form or the like, or may be used by combining them. The effects of the present invention are not affected by the above-mentioned entire shape. In short, it is required that the placement surface for situating the ceramic electronic parts has only the characteristic structure of the present invention.

The above-mentioned explanations have been made of the case where the entire surface of the setter for burning is formed as the placement surface of the ceramic electronic parts. However, a certain range of the plate surface, for example, the center portion or the like of the plate surface, may be formed as the placement surface. It is considered that peripheral portions surrounding the placement surface is made to have a compact structure by adopting the above-mentioned structure, and thereby entire strength thereof is enhanced and the opening ration of each ventilation cell on the placement surface is improved.

The explanations have been made of the case where the cross-sectional shape of each ventilation cell is an almost square. And, the above-mentioned shape too may be adopted, for example, as various forms such as a circle, a triangle, or a polygon such as a hexagon, an octagon or the like. However, a hexagon or the like is preferable to attain a closest-packed state.

The present invention utilizes cordierite ceramics, but may use other materials if the other materials have enough porosity.

The setter for burning, which is the present invention, can eminently suppress the influence on the shrinkage behavior generated during the burning of the ceramic electronic parts which are situated thereon and are burned, as compared with the conventional setter having a compact structure, a porous structure or the like. Unlike the case of use of a setter for burning, which has a conventional structure, use of the setter for burning, which is the present invention, can make the burned ceramic electronic parts indicate a warp state according to a proper shrinkage direction which the ceramic electronic parts themselves possess originally.

What is claimed is:

1. A setter for burning, which a ceramic electronic part is situated in a burning furnace when said ceramic electronic part is burned, said setter for burning comprising:

an external wall;

an electronic part placement surface for situating said ceramic electronic part thereon; and an in-furnace placement surface for situating said setter for burning in said burning furnace, wherein said setter for burning has a honeycomb structure in which a plurality of ventilation cells that is formed by each partition wall having a thickness of 0.05 to 1.0 mm and that are each partitioned in a pitch of 0.5 to 5.0 mm passes through between said electronic part placement surface and said in-furnace placement surface.

2. The setter for burning according to claim 1, wherein a supporting member for supporting said setter for burning at a predetermined height in said burning furnace is provided in a side of the in-furnace placement surface.

3. The setter for burning according to claim 2, wherein an opening ratio, which is a ratio of the total opening area of said plurality of ventilation cells to the total area of said electronic part placement surface, is 50 to 90%.

4. The setter for burning according to claim 3, wherein a porosity of a substratum constituting said setter for burning is 15 to 70%.

5. The setter for burning according to claim 4, wherein an R portion having a size of 0.1 mm or more is provided at a crossing section of each partition wall of said ventilation cells.

6. The setter for burning according to claim 5, wherein a surface roughness of the electronic part placement surface constituted by each partition wall of said ventilation cells has a maximum height of 1 $\mu$m or more and 100 $\mu$m or less and has a centerline average roughness of 0.5 $\mu$m or more and 50 $\mu$m or less.

7. The setter for burning according to claim 6, wherein a flatness of the electronic part placement surface constituted by each partition wall of said ventilation cells is 100 $\mu$m or less.

8. The setter for burning according to claim 7, wherein said setter for burning is formed of cordierite ceramics.

9. A setter for burning, which a ceramic electronic part is situated in a burning furnace when said ceramic electronic part is burned, said setter for burning comprising:
an external wall;
an electronic part placement surface for situating said ceramic electronic part thereon; and
an in-furnace placement surface for situating said setter for burning in said burning furnace,
wherein said setter for burning has a honeycomb structure in which a plurality of ventilation cells that is formed by each partition wall having a thickness of 0.05 to 1.0 mm and that is each partitioned in a pitch of 0.5 to 5.0 mm passes through between said electronic part placement surface and said in-furnace placement surface, and
wherein an opening ratio, which is a ratio of the total opening area of said plurality of ventilation cells to the total area of said electronic part placement surface, is 50 to 90%.

10. A setter for burning, which a ceramic electronic part is situated in a burning furnace when said ceramic electronic part is burned, said setter for burning comprising:
an external wall;
an electronic part placement surface for situating said ceramic electronic part thereon; and
an in-furnace placement surface for situating said setter for burning in said burning furnace,
wherein said setter for burning has a honeycomb structure in which a plurality of ventilation cells that is formed by each partition wall having a thickness of 0.05 to 1.0 mm and that is each partitioned in a pitch of 0.5 to 5.0 mm passes through between said electronic part placement surface and said in-furnace placement surface, and
wherein a porosity of a substratum constituting said setter for burning is 15 to 70%.

11. A setter for burning, which a ceramic electronic part is situated in a burning furnace when said ceramic electronic part is burned, said setter for burning comprising:
an external wall;
an electronic part placement surface for situating said ceramic electronic part thereon; and
an in-furnace placement surface for situating said setter for burning in said burning furnace,
wherein said setter for burning has a honeycomb structure in which a plurality of ventilation cells that is formed by each partition wall having a thickness of 0.05 to 1.0 mm and that is each partitioned in a pitch of 0.5 to 5.0 mm passes through between said electronic part placement surface and said in-furnace placement surface, and
wherein an R portion having a size of 0.1 mm or more is provided at a crossing section of each partition wall of said ventilation cells.

12. A setter for burning, which a ceramic electronic part is situated in a burning furnace when said ceramic electronic part is burned, said setter for burning comprising:
an external wall;
an electronic part placement surface for situating said ceramic electronic part thereon; and
an in-furnace placement surface for situating said setter for burning in said burning furnace,
wherein said setter for burning has a honeycomb structure in which a plurality of ventilation cells that is formed by each partition wall having a thickness of 0.05 to 1.0 mm and that is each partitioned in a pitch of 0.5 to 5.0 mm passes through between said electronic part placement surface and said in-furnace placement surface, and
wherein a surface roughness of the electronic part placement surface constituted by each partition wall of said ventilation cells has a maximum height of 1 $\mu$m or more and 100 $\mu$m or less and has a centerline average roughness of 0.5 $\mu$m or more and 50 $\mu$m or less.

13. A setter for burning, which a ceramic electronic part is situated in a burning furnace when said ceramic electronic part is burned, said setter for burning comprising:
an external wall;
an electronic part placement surface for situating said ceramic electronic part thereon; and
an in-furnace placement surface for situating said setter for burning in said burning furnace,
wherein said setter for burning has a honeycomb structure in which a plurality of ventilation cells that is formed by each partition wall having a thickness of 0.05 to 1.0 mm and that is each partitioned in a pitch of 0.5 to 5.0 mm passes through between said electronic part placement surface and said in-furnace placement surface, and
wherein a flatness of the electronic part placement surface constituted by each partition wall of said ventilation cells is 100 $\mu$m or less.

14. A setter for burning, which a ceramic electronic part is situated in a burning furnace when said ceramic electronic part is burned, said setter for burning comprising:
an external wall;
an electronic part placement surface for situating said ceramic electronic part thereon; and
an in-furnace placement surface for situating said setter for burning in said burning furnace,
wherein said setter for burning has a honeycomb structure in which a plurality of ventilation cells that is formed by each partition wall having a thickness of 0.05 to 1.0 mm and that is each partitioned in a pitch of 0.5 to 5.0 mm passes through between said electronic part placement surface and said in-furnace placement surface, and
wherein said setter for burning is formed of cordierite ceramics.

* * * * *